May 18, 1926.
A. E. CALDWELL
OLIVE PICKER
Filed Dec. 8, 1924
1,585,080
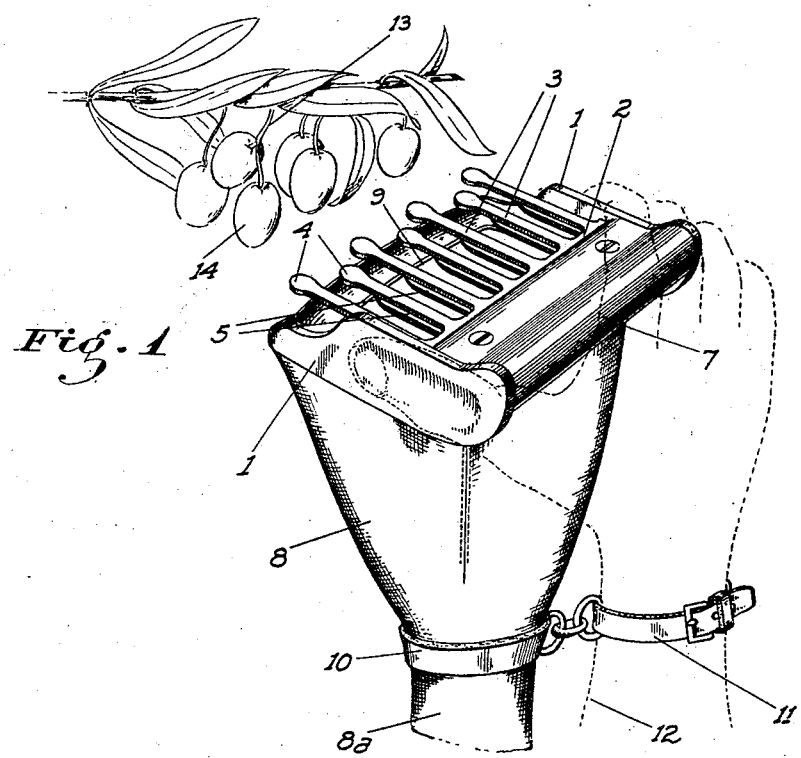
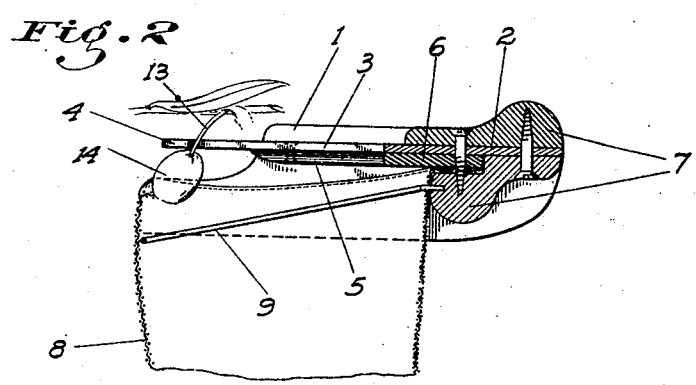
INVENTOR
Archie E. Caldwell
BY
ATTORNEY Patented May 18, 1926.

1,585,080

UNITED STATES PATENT OFFICE.

ARCHIE E. CALDWELL, OF COLUMBIA, CALIFORNIA.

OLIVE PICKER.

Application filed December 8, 1924. Serial No. 754,545.

This invention relates to a device for picking olives from the trees.

As far as I am aware, olives are still picked as they have been since the birth of the industry, namely by hand and without the benefit of any labor saving devices of any character.

The result is that picking costs are very high and the work is very hard on the hands of the pickers, since twigs and leaves scratch and chafe the skin frequently to a raw and bleeding condition.

The principal object of my invention therefore is to eliminate the above crude method by providing a device for picking the olives which will take the place of the human hand and with which a given quantity of olives may be picked in a considerably shorter time than is now possible. The picker is also constructed so that it efficiently separates the leaves and twigs from the fruit, so that only the latter will be pulled off the tree.

Another object is to arrange a means in connection with the picker so that the olives, as they are pulled off the tree, will be passed directly to a bag or the like slung from the picker, and without said picker having to pay any attention as to whether the olives are falling into the bag or not.

A further object is to provide a picker designed to be conveniently held by one hand of the operator and so arranged as a whole that the picker need never use his other hand in connection with picking operations, so that said hand is free to be used for bracing or steadying purposes, as is frequently necessary when working in tall trees.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the picker as in operation.

Fig. 2 is a sectional elevation of the same.

Referring now more particularly to the characters of reference on the drawings, the numeral 1 denotes a pair of vertical side plates spaced transversely a distance so that they may be comfortably grasped by the thumb and fingers of an average sized hand, as shown in Fig. 1.

Between the plates 1 is fixed a horizontal plate 2 having projecting forwardly therefrom and preferably formed integral therewith, a plurality of transversely spaced fingers 3. These fingers are arranged in alternately long and short relation, and the spacing therebetween is sufficient to freely receive the stems of the olives therebetween but insufficient to allow the olives themselves to pass therebetween. At the outer ends of the fingers the same are formed with rounded knobs 4, which are flat in a horizontal plane. The outer ends of the knobs on the long fingers are substantially in the same vertical plane as the adjacent ends of the plates 1.

Under the fingers and abutting thereagainst are buffers or deflector shoes 5. These shoes are formed of medium hard rubber or other substantially resilient material and are preferably formed integral with the plate 6 which projects under the plate 1 for some distance. The outer ends of the shoes terminate somewhat short of the outer ends of the fingers, and have a tapered curvature or slope toward their outer ends. Their sides also preferably slope inwardly from their upper ends somewhat, at which upper ends they are wider than the fingers.

The plates 2 and 6 are clamped together in connection with members 7 which extend between the plates 1 above and below said plates 2 and 6. These members are formed with a suitable longitudinal curvature and are disposed relative to each other so that they may serve as handles should the user desire to grasp the device by them instead of in the manner first described.

Depending from and mounted in connection with the picker is a receiving spout or chute 8 of fabric or rubber. This spout is substantially rectangular at its upper edge and extends along the side plates 1, between the same a short distance rearwardly of the front end of the plate 6, as well as across the forward ends of the plates 1 a distance below the fingers somewhat less than the height of an olive. This upper and forward edge of the spout is flexible and unsupported except at its ends, but a short distance below said upper edge is a brace or stiffening element 9 such as a wire to prevent inward collapse of the spout.

A short distance below its upper end the spout assumes a circular or cylindrical form as at 8ª, and about said cylindrical portion at its inception is secured a flexible but substantial band 10. This band is flexibly linked to a strap 11 which is adapted to be removably and adjustably fastened about the wrist 12 of the picker. This insures that the spout will remain adjacent the fore arm of the picker and will follow the movement of said arm. The lower end of the spout is preferably open and projects into the mouth of a bag or the like supported from the picker (not shown).

In operation the device is grasped by the hand of the picker in a suitable manner as before described, so that the fingers 3 are horizontally disposed and project away from the hand. The device is then manipulated so that the fingers pass in the horizontal plane of the stems 13 of the olives 14. The fingers being moved toward the stems the round knobs 4 will cause the stems to be deflected through or between the fingers. At the same time the olives will abut against and deflect the upper forward edge of the spout, temporarily depressing the same somewhat. A further forward movement of the picking device will cause the olives to spring inwardly of the spout and clear the same and they will then be trapped against jumping out easily.

When the stems pass between the shoes 5 the device is lowered. The olives will then abut against said shoes and be pulled from the stems and will drop down the spout. The resilient material of which the shoes are constructed prevents the olives from being bruised or otherwise damaged when the pulling-off pressure is exerted thereon.

The relatively narrow space between the fingers at the forward ends had on account of the enlarged knobs, and the flat surface provided by the latter in connection with the flat fingers themselves, causes the leaves of the olive tree to rest on top of said fingers instead of tending to pass down therebetween, so that said leaves are not torn off with the olives. The fingers 3 are sufficiently stiff so that they do not bend when the pulling pressure is exerted on the olives.

It will be found that with very little practice the device may be efficiently operated so that a large number of olives may be picked in a comparatively short time with but little fatigue to the picker.

While this device is especially described and designed for use in the picking of olives it may be made so as to be suitable for picking cherries, small plums and other fruit similar in size.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An olive picker including a plurality of horizontally disposed fingers transversely spaced to enable the olive stems but not the olives to pass therebetween, handle means mounted in connection with the fingers, a receiving spout arranged in connection with the fingers, the forward edge of the spout being flexible and substantially in alinement with the forward ends of certain ones of the fingers and being adjacent the same but separated therefrom a distance less than the diameter of the objects to be picked, whereby the latter on passing under the fingers will tend to depress the forward edge of the spout.

2. An olive picker including a plurality of horizontally disposed rigid and flat fingers alternately short and transversely spaced to enable the olive stems but not the olives to pass therebetween, enlarged knobs on the outer ends of the fingers, and handle means arranged in connection with the fingers at the back of the same.

3. An olive picker including a plurality of horizontally disposed fingers transversely spaced to enable the olive stems but not the olives to pass therebetween, said fingers being rigid and straight, and flat rounded enlargements on the outer ends of the fingers.

4. An olive picker including a plurality of horizontally disposed fingers transversely spaced to enable the olive stems but not the olives to pass therebetween, handle means for manipulating the picker, and spaced resilient strips disposed directly under the rear portions of the fingers and extending lengthwise thereof, said strips terminating short of the forward ends of the fingers and being tapered upwardly at the forward ends.

5. An olive picker including a plurality of horizontally disposed fingers transversely spaced to enable the olive stems but not the olives to pass therebetween, side plates projecting below the fingers and between which the latter are disposed, and means connecting said plates and fingers together to form a unitary structure, said plates forming means whereby the picker may be supported and manipulated by a human hand.

6. An olive picker including a plurality of horizontally disposed fingers transversely spaced to enable the olive stems but not the olives to pass therebetween, side plates between which the fingers are mounted and projecting below the fingers, and a receiving spout supported by said plates; the sides of the spout at the upper end thereof being secured to and extending alongside said plates while the rear end extends between and is supported in connection with the plates rearwardly of the fingers and the front end extends unsupported between the front ends of the plates a predetermined distance below the fingers.

7. An olive picker including a plurality of horizontally disposed fingers transversely spaced to enable the olive stems but not the olives to pass therebetween, handle means for manipulating the picker, a flexible receiving spout mounted in connection with and below the fingers, and a stiffening element extending around the sides and front of the spout inwardly of the same a certain distance below the top thereof.

In testimony whereof I affix my signature.

ARCHIE E. CALDWELL.